(12) United States Patent
Brock et al.

(10) Patent No.: US 8,285,222 B2
(45) Date of Patent: Oct. 9, 2012

(54) SYSTEM AND METHOD FOR IDENTIFICATION OF COMMUNICATION DEVICES

(75) Inventors: Eddie R. Brock, Rockwall, TX (US); Thomas G. Ribardo, Jr., Garland, TX (US); Darrell L. Young, Falls Church, VA (US); Yuri Owechko, Newbury Park, CA (US)

(73) Assignee: Raytheon Company, Waltham, MA (US)

( * ) Notice: Subject to any disclaimer, the term of this patent is extended or adjusted under 35 U.S.C. 154(b) by 1188 days.

(21) Appl. No.: 11/854,384

(22) Filed: Sep. 12, 2007

(65) Prior Publication Data

US 2009/0069027 A1    Mar. 12, 2009

(51) Int. Cl.
*H04B 17/00* (2006.01)
(52) U.S. Cl. .................. 455/67.16; 455/67.14; 455/106; 455/115.1; 455/116.1; 455/456.1
(58) Field of Classification Search ......................... None
See application file for complete search history.

(56) References Cited

U.S. PATENT DOCUMENTS

| | | | |
|---|---|---|---|
| 4,398,274 A * | 8/1983 | Chotiros | 367/90 |
| 4,951,058 A | 8/1990 | Schriner et al. | |
| 6,163,259 A | 12/2000 | Barsumian et al. | |
| 6,693,511 B1 * | 2/2004 | Seal | 340/10.1 |
| 6,765,527 B2 * | 7/2004 | Jablonski et al. | 342/193 |
| 6,937,639 B2 * | 8/2005 | Pendergrass et al. | 375/135 |
| 6,956,815 B2 * | 10/2005 | Chiodini | 370/210 |
| 7,464,005 B1 * | 12/2008 | Beetner et al. | 702/189 |
| 7,639,178 B1 * | 12/2009 | Mulbrook et al. | 342/146 |
| 7,660,338 B2 * | 2/2010 | Smith et al. | 375/131 |
| 2003/0179126 A1 | 9/2003 | Jablonski et al. | |
| 2007/0018792 A1 * | 1/2007 | Taki et al. | 340/10.1 |

OTHER PUBLICATIONS

PCT Notification of Transmittal of the International Search Report and the Written Opinion of the International Searching Authority, or the Declaration, regarding PCT Application No. US2008/075922 (13 pages), Jan. 30, 2009.

* cited by examiner

*Primary Examiner* — Willie J Daniel, Jr.
(74) *Attorney, Agent, or Firm* — Schwegman Lundberg & Woessner, P.A.

(57) ABSTRACT

In one embodiment, a system for identifying a communication device includes a signal generator coupled to a transmit horn and a computing system coupled to a receive horn through a receiver. The signal generator is operable to generate an excitation waveform from the transmit horn such that the communication device passively reflects a response waveform. The computing system is operable to receive the response waveform from the communication device and compare the response waveform to a plurality of reference waveforms to determine the identity of the communication device.

18 Claims, 4 Drawing Sheets

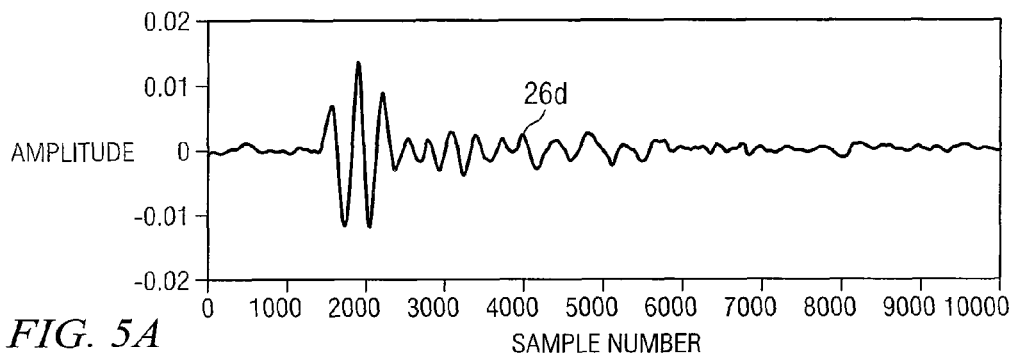
FIG. 5A
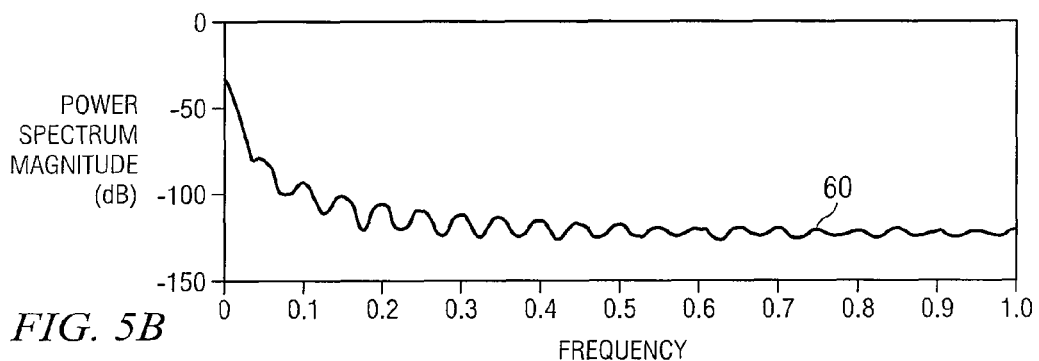
FIG. 5B
| | $30_{1a}$ | $30_{1b}$ | $30_{1c}$ | $30_{1d}$ | $30_{2a}$ | $30_{2b}$ | $30_{2c}$ | $30_{2d}$ |
|---|---|---|---|---|---|---|---|---|
| $30_{1a}$ | 3 | 0 | 0 | 0 | 1 | 0 | 0 | 0 |
| $30_{1b}$ | 0 | 3 | 0 | 0 | 0 | 0 | 0 | 1 |
| $30_{1c}$ | 0 | 0 | 4 | 0 | 0 | 0 | 0 | 0 |
| $30_{1d}$ | 0 | 0 | 3 | 1 | 0 | 0 | 0 | 0 |
| $30_{2a}$ | 0 | 0 | 0 | 0 | 4 | 0 | 0 | 0 |
| $30_{2b}$ | 0 | 0 | 0 | 0 | 0 | 4 | 0 | 0 |
| $30_{2c}$ | 0 | 0 | 0 | 0 | 0 | 0 | 4 | 0 |
| $30_{2d}$ | 0 | 0 | 0 | 0 | 0 | 0 | 0 | 4 |
FIG. 6

SYSTEM AND METHOD FOR IDENTIFICATION OF COMMUNICATION DEVICES

TECHNICAL FIELD OF THE DISCLOSURE

This disclosure generally relates to communication devices, and more particularly, to a system for identification of communication devices and a method of operating the same.

BACKGROUND OF THE DISCLOSURE

Wireless telephones are a type of communication device that enable communication by receipt and transmission of electro-magnetic signals. For covert surveillance purposes, these wireless telephones may be easily identified by associating a phone number with each particular wireless telephone. That is, any particular wireless telephone may be identified by determining phone number information included in the electro-magnetic signals when turned on. Given this technology, the location of any individual who operates a wireless telephone may be accurately tracked and recorded.

The location of wireless telephones and their associated users may be tracked for a number of reasons. For example, the telephone company that licenses usage of the wireless telephone network may desire to know the location of each user for billing and/or marketing purposes. In the field of espionage and warfare, it has become desirous to identify the locations of enemies who may carry the wireless telephone for personal communication.

SUMMARY OF THE DISCLOSURE

In one embodiment, a system for identifying a communication device includes a signal generator coupled to a transmit horn and a computing system coupled to a receive horn through a receiver. The signal generator is operable to generate an excitation waveform from the transmit horn such that the communication device passively reflects a response waveform. The computing system is operable to receive the response waveform from the communication device and compare the response waveform to a plurality of reference waveforms to determine the identity of the communication device.

Some embodiments of the present disclosure may provide numerous technical advantages. A particular technical advantage of one embodiment may be to identify a particular communication device, such as a wireless telephone, even though the device is turned off. Known communication device detection systems are generally limited to identification of communication devices when turned on. Thus, users wishing to avoid identification could easily defeat these known communication device detection systems by turning off power when not in use. Certain embodiments, may provide a solution to this problem by enabling identification of the communication device even if turned off.

While specific advantages have been disclosed hereinabove, it will be understood that various embodiments may include all, some, or none of the previously disclosed advantages. Other technical advantages may become readily apparent to those skilled in the art of communication devices.

BRIEF DESCRIPTION OF THE DRAWINGS

A more complete understanding of embodiments of the disclosure will be apparent from the detailed description taken in conjunction with the accompanying drawings in which:

FIG. 5A is an example response waveform that was taken on a prototype implementation of the embodiment of FIG. 4;

FIG. 5B is a power spectral density waveform that was calculated from the example response waveform of FIG. 5A;

FIG. 6 is a confusion matrix showing the level of accuracy of identification provided by the prototype implementation of FIG. 4.

DETAILED DESCRIPTION OF EXAMPLE EMBODIMENTS

Embodiments of the present disclosure and its advantages are best understood by referring to FIGS. 1 through 7 of the drawings, like numerals being used for like and corresponding parts of the various drawings.

In order to determine the identity of each particular wireless telephone, electro-magnetic signals transmitted and received from the wireless telephone may be intercepted in order to determine its associated phone number. However, the wireless telephone must be turned on so that identifiable phone number information may be actively transmitted and/or received from the wireless telephone. If the phone is turned off, the identity of a particular wireless telephone is not easily identified. Thus using the previously described conventional approach, identification of the wireless telephone for surveillance purposes may be defeated by turning off power to the wireless telephone.

Figures 1, 3:
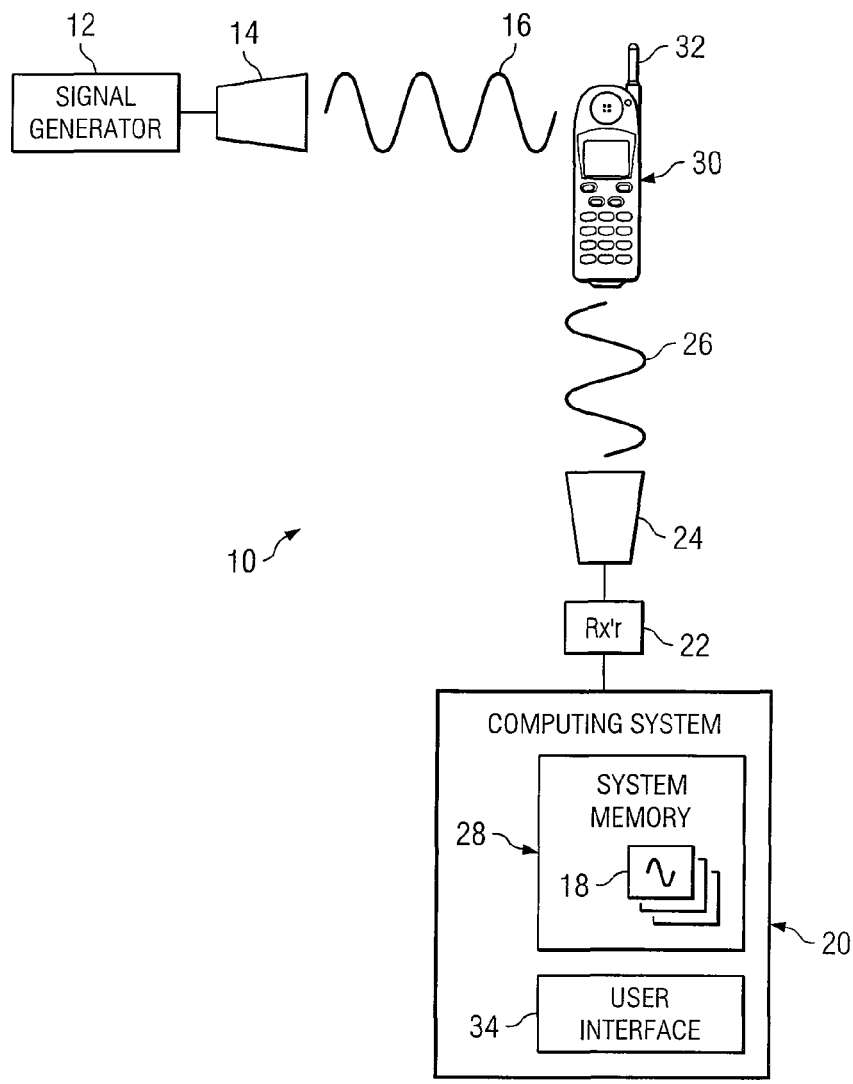
FIG. 1 is a block diagram of one embodiment of a communication device identification system according to the teachings of the present disclosure.
FIG. 3 is a confusion matrix showing the level of accuracy of identification that may be provided by the prototype implementation of FIG. 1.

FIG. 1 shows one embodiment of a system 10 for identifying a communication device such as a wireless telephone. According to various embodiments of the present disclosure, the system 10 may enable identification of particular communication devices whether they are turned on or off. The system 10 generally includes a signal generator 12 that is coupled to a transmit horn 14 in order to produce an excitation waveform 16. The system 10 also has a computing system 20 that is coupled to a receive horn 24 though a receiver 22. Receive horn 24 is configured to receive a response waveform 26 that includes reflected electro-magnetic energy from excitation waveform 16 that impinges on a communication device 30. As described in detail below, the excitation waveform 16 may cause the communication device 30 to passively reflect a portion of the excitation waveform 16 as a response waveform 26. According to the teachings of the present disclosure, this response waveform 16 may be compared with a number of reference waveforms 18 to identify the communication device 30. In one embodiment, a feature vector may be computed based on the response waveform 16 and other known/measured characteristics of the receive/transmit system. This feature vector can then be compared to the reference waveforms 18 in the form of a library of reference feature vectors to identify the communications device 30.

In the event that a particular communication device 30 is identified, visual or audible information regarding the identity of the communication device 30 may be provided to the user via a user interface 34. As an example in which the communication device 30 is a wireless telephone, user interface 34 may provide information regarding the individual and/or the phone number who possesses that particular wireless telephone. In one embodiment, user interface 34 is a display capable of providing visual information to the user, such as a cathode ray tube (CRT), or a liquid crystal display (LCD). In the event that a particular communications device is not identified, the unidentified waveform or feature vector may be added to the number of reference waveforms 18 in the form of a library of reference feature vectors for future identification.

The particular type of communication device 30 is described below as a type of wireless telephone that may be, for example, a cellular telephone. However, the communication device 30 may be any device suited for communication using electro-magnetic signaling, such as remote garage door openers, remote home appliance controllers, remote doorbell controllers, and personal communication devices, such as walkie-talkies. The communication device 30 generally includes an antenna 32 and circuitry (not specifically shown) that enables passive reflection of the excitation waveform 16 as a response waveform 26. Passive refection refers to a characteristic of communication devices 30 in which a response waveform 26 may be reflected from an excitation by electrical components in the communication device 30 without use of external electrical power, such as electrical power derived from batteries or the like. Because the communication device 30 passively reflects the excitation waveform 16 as response waveform 26, it may not be necessary for the communication device to be turned on in order to identify the particular communication device 30.

The antenna 32 and associated circuitry of each communication device 30 may have physical characteristics that enable unique identification by the system 10. For example, communication devices 30 constructed by differing manufacturers may utilize differing circuit topologies. These differing circuit topologies may operate to passively reflect the excitation waveform 16 in a different manner from one another. Additionally, communication devices 30 made by the same manufacturer may have antennas 32 or associated circuitry with slight physical irregularities relative to one another that may enable passive reflection of a unique response waveform 26 relative to one another. Thus, each communication device 30 may have unique physical characteristics that enable passive reflection of a unique response waveform 26 for identification by the system 10.

Signal generator 12 may generate any suitable signal capable of causing the transmit horn 14 to emit electro-magnetic energy as an excitation waveform 16. In one embodiment, the signal generator 12 is configured to generate an excitation waveform 16 having a number of frequencies that are approximately at the operating frequency range of the communication device 30. In another embodiment, signal generator 12 is an ultra-wide bandwidth signal generator. Communication devices 30, such as wireless telephones, utilize spread spectrum techniques in which communication signals are spread over a range of frequencies. Thus, signal generator 12 may be configured to transmit an excitation waveform 16 that includes a number of frequencies approximately in the range of the spread spectrum envelope. In this manner, the system 10 may be able to efficiently utilize the reflective aspects of the antenna 32 and associated circuitry of the communication device 30. Generating the excitation waveform 16 over a range of frequencies may also provide for identification of a number of differing communication devices 30 each having differing ranges of operating frequencies. In another embodiment, signal generator 12 may be configured to generate an excitation waveform 16 that is time deterministic and spectrally noncoherent.

Certain embodiments may provide an advantage in that an excitation waveform 16 that is time deterministic and spectrally noncoherent may be relatively difficult to detect by the user of the communication device 30. If provided as a momentary pulse, the spectrally noncoherent excitation waveform 16 may include a number of electro-magnetic vectors, the sum of which generally converge toward zero. Thus, the resultant electro-magnetic energy produced by the signal generator 12 may be relatively low, thereby retarding detection by enemy sensors.

Transmit horn 14 and receive horn 24 may be any suitable device capable of transmitting excitation waveform 16 and receiving response waveform 26 at the desired frequencies respectively. In one embodiment, transmit horn 14 is configured to generate excitation waveform 16 having a directional field pattern or main lobe. That is, transmit horn 14 may be directional in that the excitation waveform 16 may have a relatively narrow field pattern. In another embodiment, receive horn 24 may have a relatively narrow field pattern in a similar manner to transmit horn 14 such that transmit horn 14 and receive horn 24 may be simultaneously scanned over an area to identify the existence of communication devices 30. In another embodiment, transmit horn 14 and/or receive horn 24 may be an electronically scanned antenna array.

Figure 2A:
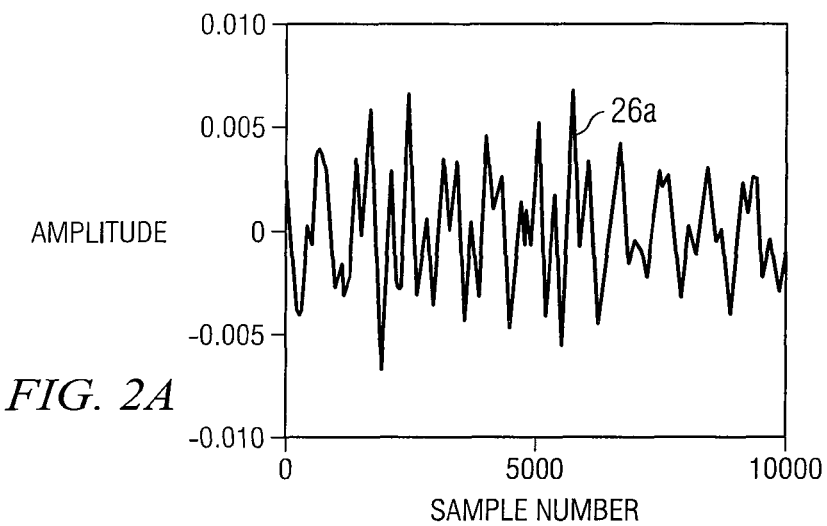
FIGS. 2A through 2C are example response waveforms that were taken on a prototype implementation of the embodiment of FIG. 1.
Figure 2B:
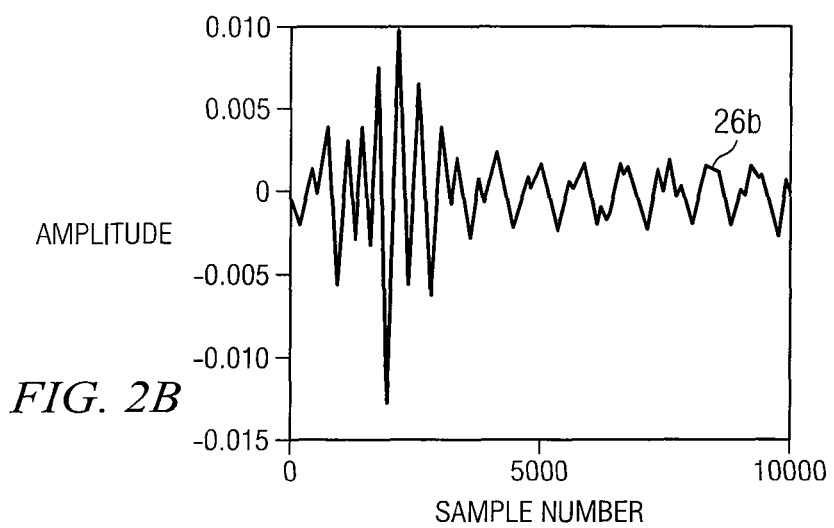
Figure 2C:
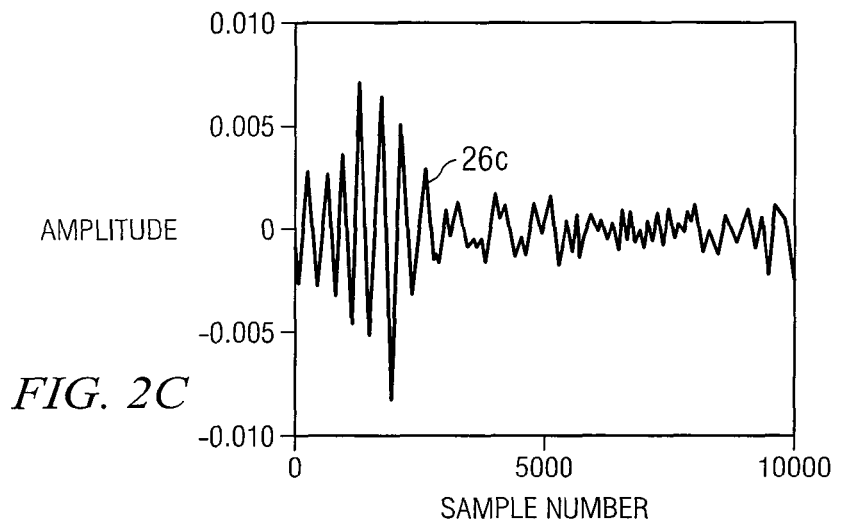

FIGS. 2A through 2C shows several example response waveforms 26a, 26b, and 26c that were received by a prototype implementation of system 10. In these particular response waveforms 26, communication device 30 is a wireless telephone. However it should be appreciated that the prototype may be used on any type of communication device 30 that enables passive reflection of the excitation waveform 16 as a response waveform 26. In each of the FIGS. 2A through 2C, the response waveform 26 corresponds to differing operating states of the communication device 30. In FIG. 2A, a response waveform 26a is received in which the communication device 30 is not present. In FIG. 2B, a response waveform 26b is received in which the communication device 30 is present and turned on. In FIG. 2C, a response waveform 26c is received in which the communication device 30 is present and turned off.

Although the response waveforms 26a, 26b, and 26c shown are representative of one particular communication device 30, response waveforms 26 from other communication devices 30 may be different due to reasons described above. Thus, the system 10 may be operable to identify particular communication devices 30 and their associated operating state based upon the response waveform 26 received. According to the teachings of the present disclosure, system 10 may measure and record response waveforms 26a, 26b, and 26c for each operating state of the communication device 30 and store these response waveforms 26 as reference waveforms 18 in system memory 28. At a later time, the system 10 may be operable to compare a response waveform 26 of an unknown communication device 30 with a number of reference waveforms 18 in order to determine the identity of the communication device 30 and/or the operating state of the communication device 30.

In one embodiment, the system 10 may store the reference waveform 18 as one or more feature vectors each having a response peak amplitude and an associated relative response time. During comparison, the computing system 20 may derive similar feature vectors having a response peak amplitude and an associated relative response time from the response waveform 26. Thus, the one or more feature vectors of the response waveform 26 may be compared with a corresponding one or more feature vectors of reference waveforms 18 in order to determine the identity of the communication device 30. In another embodiment, feature vectors may be linearly sampled over the reference 18 and response 26 waveforms. In another embodiment, feature vectors may use a non-linear sampling function, such as an exponential, logarithmic, or sinusoidal sampling algorithm. In yet another embodiment, feature vectors may be sampled according to the function $10*\text{Log}_{10}$.

The computing system 20 may use any suitable mathematical algorithm for comparing the response waveform 26 with one or more reference waveforms 18. In one embodiment, the response waveform 26 and reference waveform 18 may compared according to a k-nearest neighbor (k-NN) algorithm. The k-nearest neighbor algorithm maps feature vectors of the reference waveforms 18 into a feature space in order to form training examples. During operation, feature vectors of the response waveform 26 may be compared with feature vectors of the one or more reference waveforms 18 by computing a Euclidean distance in order to determine a best match.

FIG. 3 is a confusion matrix 40 showing a degree of accuracy that may be attained by use of the k-nearest neighbor algorithm with the prototype implementation of system 10. A confusion matrix 40 is a particular type of table in which columns 42 including measured test results may be compared with rows 44 including a number of actual specimens of communication devices 30a and 30b. In this particular confusion matrix 40, labels 30a and 30b each refer to one particular communication device, which in this case are different wireless telephones. Label CAL refers to a calibration measurements that were conducted with no communication device 30a or 30b present. In this particular confusion matrix 40, a total of 20 samples were taken on each communication device 30a and 30b in which ten were conducted with the communication device 30a and 30b turned on and ten were conducted with the communication device 30a and 30b turned off. As can be seen, the prototype implementation of system 10 using the k-nearest neighbor algorithm was able to accurately identify the identity of the communication device 30a and 30b with an approximate 95 percent degree of accuracy.

Figure 4:
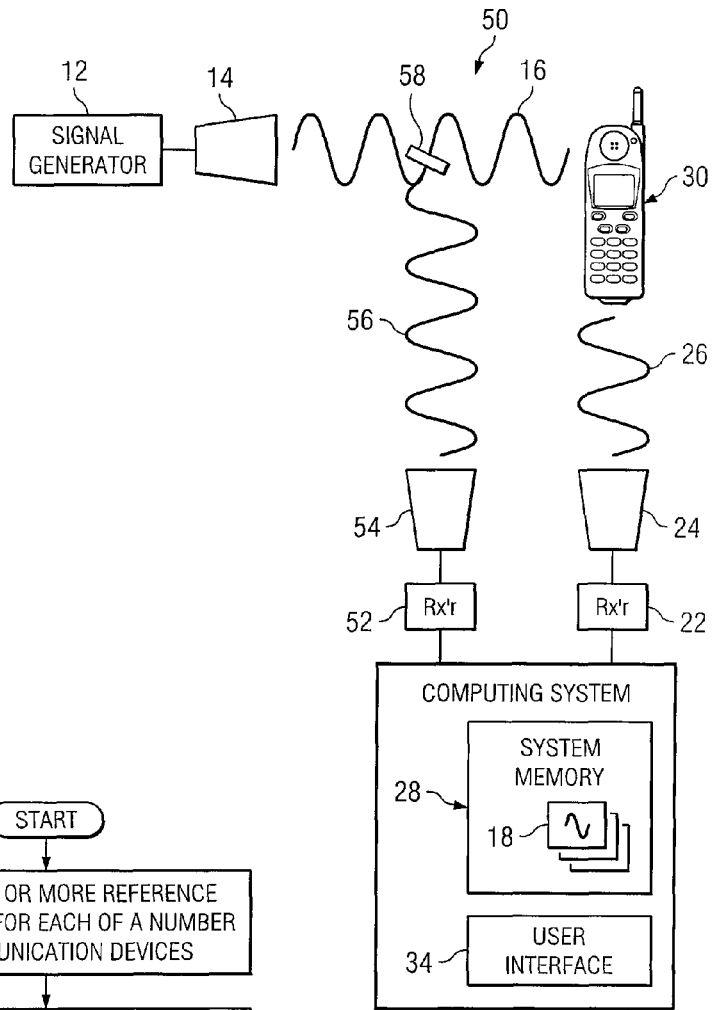
FIG. 4 is another embodiment of a communication device identification system according to the teachings of the present disclosure.

FIG. 4 shows another embodiment of a system 50 that may be used for identifying a communication device 30. System 50 has a signal generator 12, transmit horn 14, receiver 22, receive horn 24, and computing system 20 that are similar in design and purpose to corresponding elements of system 10. System 50 differs however in that a second receiver 52 and receive horn 54 are implemented to receive a sample waveform 56 from a splitter 58. Computing system 20 may be operable to combine response waveform 26 with sample waveform 56 through a transfer function. Using this type of arrangement, the response waveform 26 may be computed through a transfer function that serves to cancel variations in signal generator 12 and/or transmit horn 14 characteristics, or atmospherically generated common mode noise in some embodiments.

FIG. 5 shows one example power spectral density waveform 60 that may be computed from a corresponding example response waveform 26d. In one embodiment, computing system 20 is operable to compare a response power spectral density of the response waveform 18 to a power spectral density of the response waveform 26d. In another embodiment, the power spectral density waveform 60 may be computed by computing system 20 using one or more discrete Fourier transforms. In another embodiment, power spectral density waveform 60 may be computed by computing system 20 using a filter, such as a Hamming window. In another embodiment, the power spectral density waveform 60 may be computed by computing system 20 using multiple power spectral density waveforms 60 that are averaged together.

FIG. 6 is another confusion matrix 70 showing a degree of accuracy that may be attained with the prototype implementation of system 50. In this particular confusion matrix 70, the power spectral density of response waveform 26 is compared with power spectral density of reference waveform 18 stored in system memory 28 in order to determine the identity of the communication device 30. In a similar manner to confusion matrix 40 described above, a number of columns 42 each indicate a quantity of test samples that were identified by the system 50 and a corresponding number of rows 44 indicate actual specimens of communication devices $30_1$ and $30_2$. Four test samples were administered for various operating states of each communication device $30_1$ and $30_2$. That is, labels $30_{1a}$, $30_{1b}$, $30_{1c}$, and $30_{1d}$ each refer to differing operating states of one particular communication device $30_1$. Labels $30_{2a}$, $30_{2b}$, $30_{2c}$, and $30_{2d}$ each refer to differing operating states of the other communication device $30_2$. $30_{1a}$ and $30_{2a}$ refer to an operating state of the communication device 30 that has an active association with a wireless telephone network. $30_{1b}$ and $30_{2b}$ refer to a calibration condition where no communication device 30 is present. $30_{1c}$ and $30_{2c}$ refer to an operating state of the communication device 30 that is turned on but not actively associated with a wireless telephone network. $30_{1d}$ and $30_{2d}$ refer to an operating state of the communication device 30 that is turned off. Thus, the system 50 may be operable to identity the operating state of the communication device 30 as well as the communication device 30 itself.

In the particular measurements shown in FIG. 6, the prototype implementation calculated multiple test samples of spectral power density of the response waveforms 26. Also, each response waveform 26 was computed with a corresponding sample waveform 56 through a transfer function. Additionally, reference waveforms 56 and response waveforms 26 were sampled according to the function $10*\text{Log}_{10}$. As can be seen, the prototype implementation of system 10 that performed the comparison using the previously described mathematical manipulations was able to accurately identify the identity of the communication device 30 as well as its operating state with an approximate 84.4 percent degree of accuracy.

Figure 7:
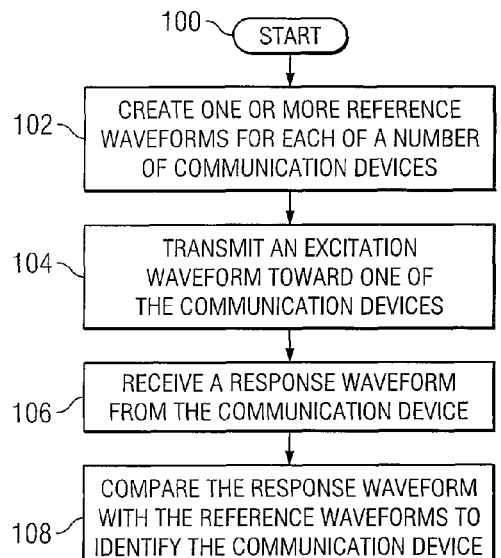
FIG. 7 is a flowchart depicting a series of actions that may be performed in order to operate the communication device identification system of FIG. 1 or 4.

FIG. 7 is a flowchart depicting a series of actions that may be performed by the system 10 or 50 in order to identify a particular communication device 30 from among a number of unknown communication devices 30. In act 100 the system 10 or 50 is initiated. The system 10 or 50 may be initiated by applying electrical power and any associated boot strapping operations to the signal generator 12, receiver 22, and computing system 20. In act 102, one or more reference waveforms 18 are created for each of a number of communication devices 30. In one embodiment, multiple reference waveforms 18 may be created that are each respective of the operating state of each communication device 30. Once created, the identity of the communication device 30 along with its reference waveforms 18 corresponding to its differing operating states may be stored in system memory 28.

In act 104, the signal generator 12 may generate an excitation waveform 16 that is transmitted by transmit horn 14 towards an unknown communication device 30. In one embodiment, excitation waveform 16 may be generally directional in that the excitation waveform 16 may be s scanned horizontally through an azimuthal extent or vertically through an elevational extent. In another embodiment, transmit horn 14 may be physically scanned using a motorized pivot structure or may be electronically scanned using an array of transmit horns 14.

In act 106, the system 10 or 50 may receive a response waveform 26 that was reflected by the communication device 30. In act 108, the system 10 or 50 may then compare the response waveform 26 with one or more reference waveforms 18 stored in system memory 28 in order to determine the identity of the communication device 30.

The previously described series of actions act 102 through act 108 continues with receipt of each response waveform 26 in order to determine the identity of other communication devices 30 in the field pattern of the transmit 14 and receive 24 horns. Once identification of unknown communication devices 30 is no longer desired, the process is halted at act 110 in which electrical power to the signal generator 12, receiver 22, and computing system 20 may be turned off.

A system and method has been disclosed in which unknown communication devices 30 may be identified. In addition to identifying the particular communication device 30, the system 10 or 50 may also be operable to identify the operating state of the communication device 30. Thus, users who wish to avoid identification by turning off power to the communication device 30 may be forced into other exploitable modes.

What is claimed is:

1. A system for identifying a wireless telephone comprising:
    a signal generator operable to generate a time deterministic, spectrally noncoherent waveform from a transmit horn such that the wireless telephone passively reflects a response waveform, the time deterministic, spectrally noncoherent waveform having a range of frequencies approximately at the operating frequencies of the wireless telephone, and wherein the time deterministic, spectrally noncoherent waveform includes a plurality of electro-magnetic vectors, the sum of which substantially converge toward zero; and
    a computing system coupled to a receive horn through a receiver, the computing system being operable to:
        scan the time deterministic, spectrally noncoherent waveform through an azimuthal or elevational extent;
        receive the response waveform from the wireless telephone; and
        compare the response waveform to a plurality of reference waveforms to determine the identity of the wireless telephone and the operating mode of the wireless telephone.

2. A system for identifying a communication device comprising:
    a signal generator operable to generate an excitation waveform from a transmit horn such that the communication device passively reflects a response waveform; and
    a computing system coupled to a receive horn through a receiver, the computing system being operable to:
        receive the response waveform from the communication device; and
        compare the response waveform to a plurality of reference waveforms to determine the identity of the communication device,
    wherein the signal generator is further operable to generate a time deterministic, spectrally noncoherent waveform, wherein the time deterministic, spectrally noncoherent waveform includes a plurality of electro-magnetic vectors, the sum of which substantially converge toward zero.

3. The system of claim 2, wherein the computing system is further operable to compare a response peak amplitude and a relative response time of the response waveform to a reference peak amplitude and a reference time of the reference waveform respectively.

4. The system of claim 3, wherein the computing system is operable to compare the response peak amplitude to the reference peak amplitude and response time to the reference time using a k-nearest-neighbor algorithm.

5. The system of claim 3, wherein the reference waveform is recorded from the communication device for an operating state that is selected from the group consisting of turned on, turned off, active association with a communication network, no active association with a communication network, and the communication device is not present.

6. The system of claim 2, wherein the computing system is further operable to compare a response power spectral density of the response reference waveform to a sample power spectral density of a sample waveform.

7. The system of claim 2, wherein the computing system is further operable to provide, using a display, visual information regarding the identity of the communication device in the event that the communication device is identified.

8. The system of claim 2, wherein the reference waveform is stored in a system memory of the computing system.

9. The system of claim 2, wherein the transmit horn and the receive horn has a generally directional field pattern, the computing system being further operable to scan the directional field pattern through an azimuthal or elevational extent.

10. The system of claim 9, wherein the transmit horn comprises an array of transmit horns and the receive horn comprises an array of receive horns, the computing system being further operable to electronically scan the array of transmit horns and the array of receive horns.

11. The system of claim 2, wherein the communication device is a wireless telephone.

12. The system of claim 2, wherein the signal generator is an ultra-wide bandwidth transmitter.

13. The system of claim 12, wherein the signal generator is further operable to generate the excitation waveform having a range of frequencies approximately at the operating frequencies of the communication device.

14. A computer implemented method for identifying a communication device comprising:
    transmitting an excitation waveform such that the communication device passively reflects a response waveform;
    receiving the response waveform from the communication device; and
    comparing the response waveform to a plurality of reference waveforms to determine the identity of the communication device,
    wherein transmitting an excitation waveform further comprises transmitting a time deterministic, spectrally noncoherent waveform, wherein the time deterministic, spectrally noncoherent waveform includes a plurality of electro-magnetic vectors, the sum of which substantially converge toward zero.

15. The computer implemented method of claim 14, further comprising creating one of the plurality of reference waveforms by storing the response waveform in a system memory.

16. The computer implemented method of claim 14, further comprising scanning the excitation waveform through an azimuthal or elevational extent.

17. The computer implemented method of claim 14, wherein comparing the response waveform to the plurality of reference waveforms further comprises identifying the operating mode of the communication device.

18. The computer implemented method of claim 14, wherein comparing the response waveform to the plurality of reference waveforms further comprises comparing a response power spectral density of the response waveform to a reference power spectral density of the reference waveform.

* * * * *